Patented Mar. 2, 1954

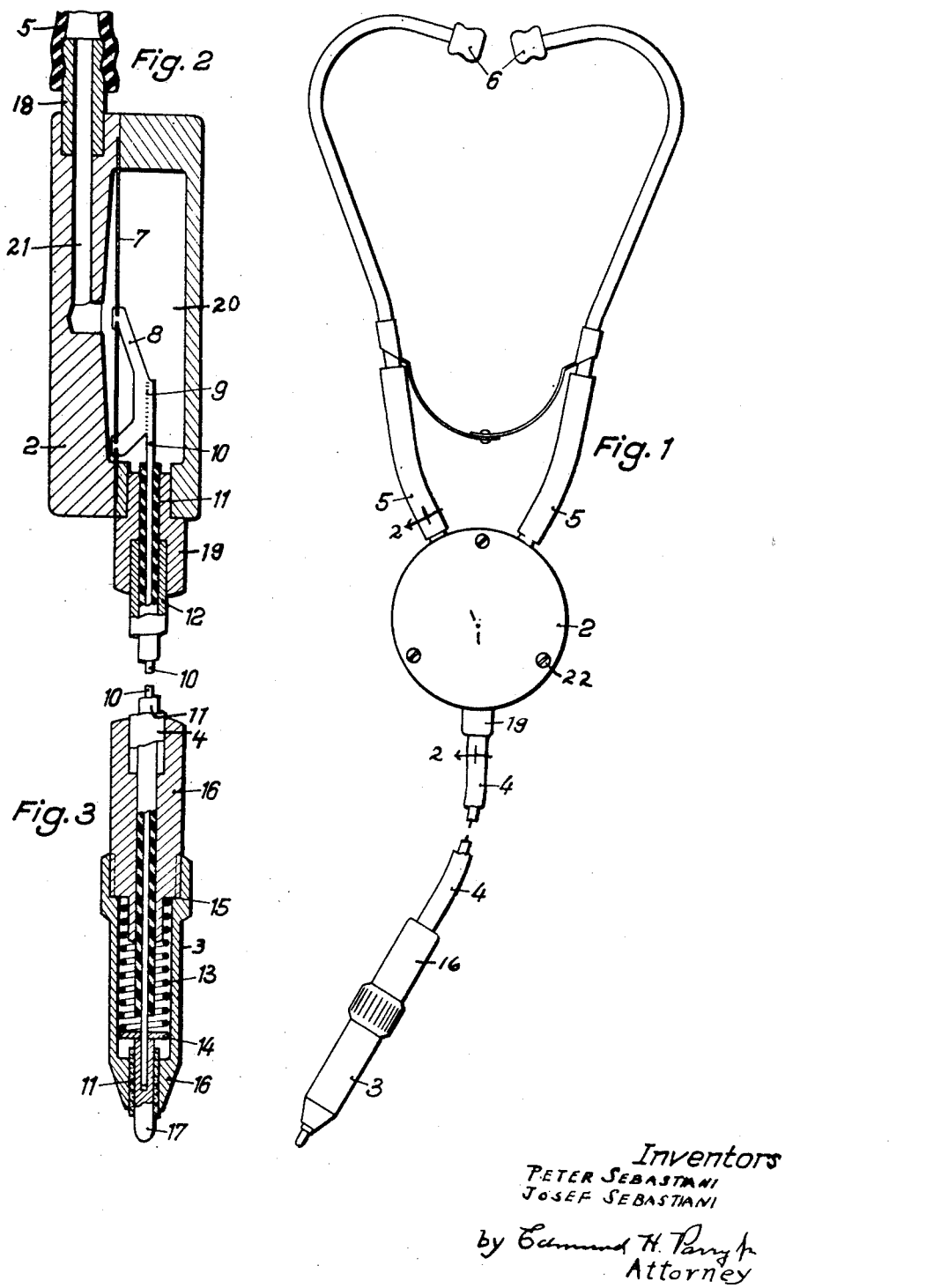

2,670,806

UNITED STATES PATENT OFFICE 2,670,806

INSTRUMENT FOR LOCATING DEFECTS IN MACHINERY, PIPE LINES, AND THE LIKE

Peter Sebastiani and Josef Sebastiani,
Ueberlingen-Bodensee, Germany

Application September 6, 1950, Serial No. 183,442

3 Claims. (Cl. 181—24)

Our invention relates to instruments for locating defects in machinery by the detection of vibrations in objects. It is particularly adapted for use in connection with internal combustion engines and other machinery but it is also adapted for other uses such as pipe lines of water works or the like. It has heretofore been proposed to detect defects through vibrations in objects by means of metal tools of relatively large mass which are difficult to bring to the source of the vibration to be detected in objects. Also, because of their mass such prior devices were limited in their sensitivity to vibrations. Usually such prior devices comprised a rigid metal rod, one end of which was placed against a machine or other object under examination. Vibrations picked up by the rod were transmitted directly or indirectly to the human ear. The present invention provides an improved form of vibration detecting instrument comprising an elongated thin element of low mass adapted to vibrate longitudinally in response to vibrations detected in an object, and vibrations of which are translated into vibrations audible to the ear. Because of the small mass of such element it is more sensitive to vibrations than prior devices and is capable of transmitting vibrations of higher frequency. The elongated member may comprise an inextensible metal wire or rope of small cross section and the same is of flexible character, capable of bending so that its detecting end may be applied to remote and hidden points of machinery or other objects which would be inaccessible to a rigid detecting element.

It is further proposed according to the invention that the elongated member be subjected to a constant longitudinal tension so that longitudinal vibrations set up therein will not be translated into transverse vibrations such as might decrease the sensitivity of the instrument. It is further proposed to encase the elongated element in resilient material such as rubber which is also adapted to suppress transverse vibrations therein.

The invention will be understood by reference to the accompanying drawing wherein:

Fig. 1 is an elevational view of a preferred form of instrument embodying the invention;

Fig. 2 is a fragmentary sectional view of parts of the instrument taken on line 2—2 of Fig. 1; and Fig. 3 is a fragmentary sectional view of further parts of the instrument.

The instrument includes an elongated flexible metal member 10 of relatively small diameter and of fixed length supported so that it will vibrate longitudinally in response to vibrations received from an object through an exposed detecting end thereof. As shown, the detecting end may be formed as a separate round-ended tip 17 of larger diameter than element 10 and rigidly secured thereto.

Supporting elongated element 10 is a flexible tube 4 so arranged that the element is capable of longitudinal vibration independently of the tube. Surrounding element 10 and separating it from tube 4 is a resilient layer or tube. The same being adapted to prevent translation of longitudinal vibrations in the element into transverse vibrations. Such layer or tube may be of rubber or other suitable resilient material. It will be understood that the surrounding tubes 4 and 11 and detecting element 10 can bend as a unit without impairing longitudinal vibrations of the detecting element or proper operation of the instrument as a whole.

The portion of elongated element 10 adjacent its detecting end is surrounded by manipulating handle 16 having a hollow lower portion 3 and through the outer end of which protrudes tip 17. The outer end of tubular member 4 is fitted into the upper end of such handle. By means of the handle, the detecting tip can be brought to and held in operating contact with the object under examination.

Opposite end of tube 12 is fitted in a bushing 19 of a diaphragm casing 2. Housed in such casing is a diaphragm 7. Casing 2 is made in two sections having margins embracing the periphery of the diaphragm and held together by means of screws 22. The diaphragm is adapted to vibrate in chamber 20 of the casing. A crank lever 8 has its arm secured to the center and peripheral area of the diaphragm. Inner end 9 of elongated member 10 extends into the diaphragm chamber and is rigidly secured to the crank arm. Longitudinal vibrations of the elongated element are translated by crank lever 8 into vibrations of the diaphragm.

One section of casing 2 is provided with a pair of diverging air passages 21 which connect with nipples 18. Nipples 18 are connected to hollow flexible hoses 5 of a stethoscope having ear pieces 6. Vibrations of diaphragm 7 are translated into air vibrations which are audible to the ear through the stethoscope.

Elongated element 10 is desirably subjected to longitudinal tension, as before explained, to prevent transverse vibration thereof. This is accomplished through a spring 13 located in hollow portion 3 of handle 16. One end of the spring engages a seat 15 in the handle. The other end of the spring engages a metal washer 14 which surrounds element 10 and acts against the inner end of tip 17 thereof.

It would be apparent that the intensity of vibrations transmitted to the diaphragm through element 10 can be varied according to the strength of spring 13. Because of the tensioning action of such spring and the resilient tubing 11 high vibrations will be transmitted particularly well while low vibrations will be considerably deadened. It is desirable not only to tension element 10 but also to tension diaphragm 7. In the present embodiment this is also accomplished through spring 13, the same acting on the diaphragm through element 10 and crank lever 8.

What we claim is:

1. A vibration detecting instrument comprising an elongated, thin, flexible member having a vibration detecting end adapted to contact objects subject to vibration, means supporting said flexible metal member for longitudinal vibration under the vibrations received by said detecting end, a casing housing a diaphragm, means for translating longitudinal vibrations of said flexible metal member into vibrations of said diaphragm and means for transmitting to the human ear air vibrations set up by vibrations of said diaphragm, said supporting means comprising a flexible tube surrounding said flexible metal member with which said flexible metal member is bendable as a unit and in which said flexible metal member is subject to longitudinal vibration independently of said tube, said tube connecting at one end to the diaphragm casing and terminating at its other end short of the detecting end of said flexible metal member, and including a flexible tube of resilient material encasing and in surrounding contact with the flexible metal member and adapted to suppress transverse vibration of said flexible metal member.

2. A vibration detecting instrument comprising an elongated, thin flexible metal member having a vibration detecting end adapted to contact objects subject to vibration, means supporting said flexible metal member for longitudinal vibration under the vibrations received by said detecting end, a casing housing a diaphragm, means for translating longitudinal vibrations of said flexible metal member into vibrations of said diaphragm and means for transmitting to the human ear vibrations set up by vibrations of said diaphragm, said supporting means comprising a flexible tube surrounding said flexible metal member with which said flexible metal member is bendable as a unit and in which said flexible metal member is subject to longitudinal vibration independently of said tube, said tube connecting at one end to the diaphragm casing and terminating at its other end short of the detecting end of said flexible metal member, and including spring means extending lengthwise of the flexible metal member and means for causing said spring means to subject the flexible metal member to constant longitudinal tension.

3. A vibration detecting instrument comprising an elongated, thin, flexible metal member having a vibration detecting end adapted to contact objects subject to vibration, means supporting said flexible metal member for longitudinal vibration under the vibrations received by said detecting end, a casing housing a diaphragm, means for translating longitudinal vibrations of said flexible metal member into vibrations of said diaphragm and means for transmitting to the human ear air vibrations set up by vibrations of said diaphragm, said supporting means comprising a flexible tube surrounding said flexible metal member with which said flexible metal member is bendable as a unit and in which said flexible metal member is subject to longitudinal vibration independently of said tube, said tube connecting at one end to the diaphragm casing and terminating at its other end short of the detecting end of said flexible metal member, and including spring means subjecting the flexible metal member to constant longitudinal tension and acting through said flexible metal member to subject the diaphragm to constant transverse tension.

PETER SEBASTIANI.
JOSEF SEBASTIANI.

References Cited in the file of this patent

UNITED STATES PATENTS

| Number | Name | Date |
| --- | --- | --- |
| 989,714 | Lepre | Apr. 18, 1911 |
| 1,466,825 | Foord | Sept. 4, 1923 |
| 1,708,992 | Woekeck | Apr. 16, 1929 |
| 2,086,537 | Codero | July 13, 1931 |
| 2,261,375 | Jacobs | Nov. 4, 1941 |

FOREIGN PATENTS

| Number | Country | Date |
| --- | --- | --- |
| 124,556 | Switzerland | Feb. 1, 1928 |
| 102,571 | Australia | Dec. 2, 1937 |
| 590,744 | Great Britain | July 28, 1947 |